US010112447B2

(12) United States Patent
Edwards et al.

(10) Patent No.: US 10,112,447 B2
(45) Date of Patent: Oct. 30, 2018

(54) VEHICLE SERVICING AND MONITORING METHOD AND SYSTEM

(71) Applicant: Love's Travel Stops & Country Stores, Inc., Oklahoma City, OK (US)

(72) Inventors: Matthew Thomas Edwards, Phoenix, AZ (US); Kenneth Joseph Coyne, Kent, OH (US)

(73) Assignee: Love's Travel Stops & Country Stores, Inc., Oklahoma City, OK (US)

( * ) Notice: Subject to any disclaimer, the term of this patent is extended or adjusted under 35 U.S.C. 154(b) by 0 days.

(21) Appl. No.: 15/624,449

(22) Filed: Jun. 15, 2017

(65) Prior Publication Data

US 2017/0334251 A1 Nov. 23, 2017

Related U.S. Application Data

(62) Division of application No. 14/616,469, filed on Feb. 6, 2015, now Pat. No. 9,707,806.

(51) Int. Cl.
*B60C 23/00* (2006.01)
*B60S 5/04* (2006.01)
*B60S 5/02* (2006.01)

(52) U.S. Cl.
CPC .......... *B60C 23/001* (2013.01); *B60S 5/046* (2013.01); *B60S 5/02* (2013.01)

(58) Field of Classification Search
CPC ....... B60C 34/001; B60C 23/001; B60S 5/04; B60S 5/046; B60S 5/02

USPC ...................... 73/146, 146.2; 152/415; 141/2
See application file for complete search history.

(56) References Cited

U.S. PATENT DOCUMENTS

| | | | | |
|---|---|---|---|---|
| 4,037,638 A * | 7/1977 | Mosca | ..................... | B60C 23/10 141/38 |
| 5,445,020 A * | 8/1995 | Rosensweig | ............ | G01L 1/146 73/146 |
| 6,825,758 B1 * | 11/2004 | Laitsaari | ............. | B60C 23/0433 116/34 R |
| 7,624,774 B2 * | 12/2009 | Lighter | ................... | B60S 5/046 141/237 |
| 7,975,731 B2 * | 7/2011 | Shultz | ..................... | B60S 5/046 141/38 |
| 8,191,586 B2 * | 6/2012 | Huval | ..................... | B60S 5/046 141/38 |
| 8,433,471 B2 * | 4/2013 | Christensen | ........... | G06Q 20/40 701/29.1 |
| 9,057,658 B2 * | 6/2015 | Norman Rose | ......... | G01L 1/146 |
| 9,539,866 B2 * | 1/2017 | Mouchet | .............. | G07C 5/0808 |
| 9,707,806 B2 * | 7/2017 | Edwards | ............... | B60C 23/001 |

* cited by examiner

*Primary Examiner* — Timothy L Maust
(74) *Attorney, Agent, or Firm* — McAfee & Taft

(57) ABSTRACT

A method and system for servicing a vehicle in accordance with pre-determined maintenance settings is provided. Maintenance settings can be communicated to a vehicle maintenance tool via a communication device and the vehicle maintenance tool can interact with the vehicle in accordance with the maintenance settings.

19 Claims, 5 Drawing Sheets

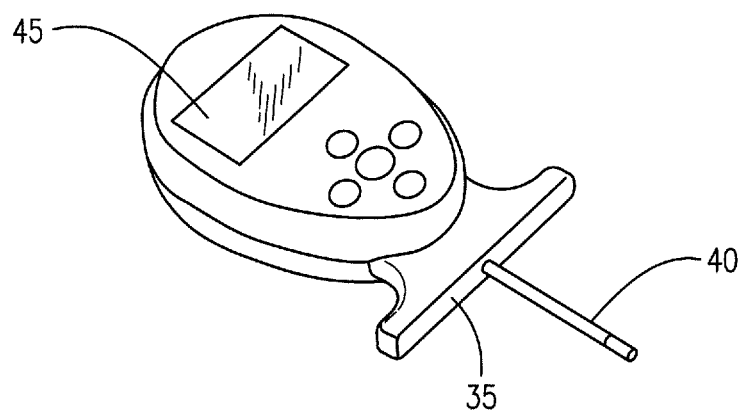
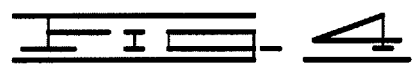
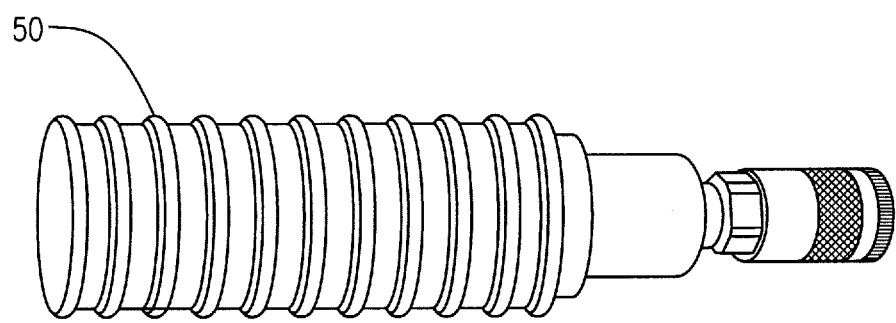
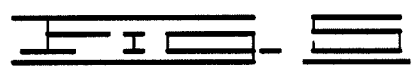

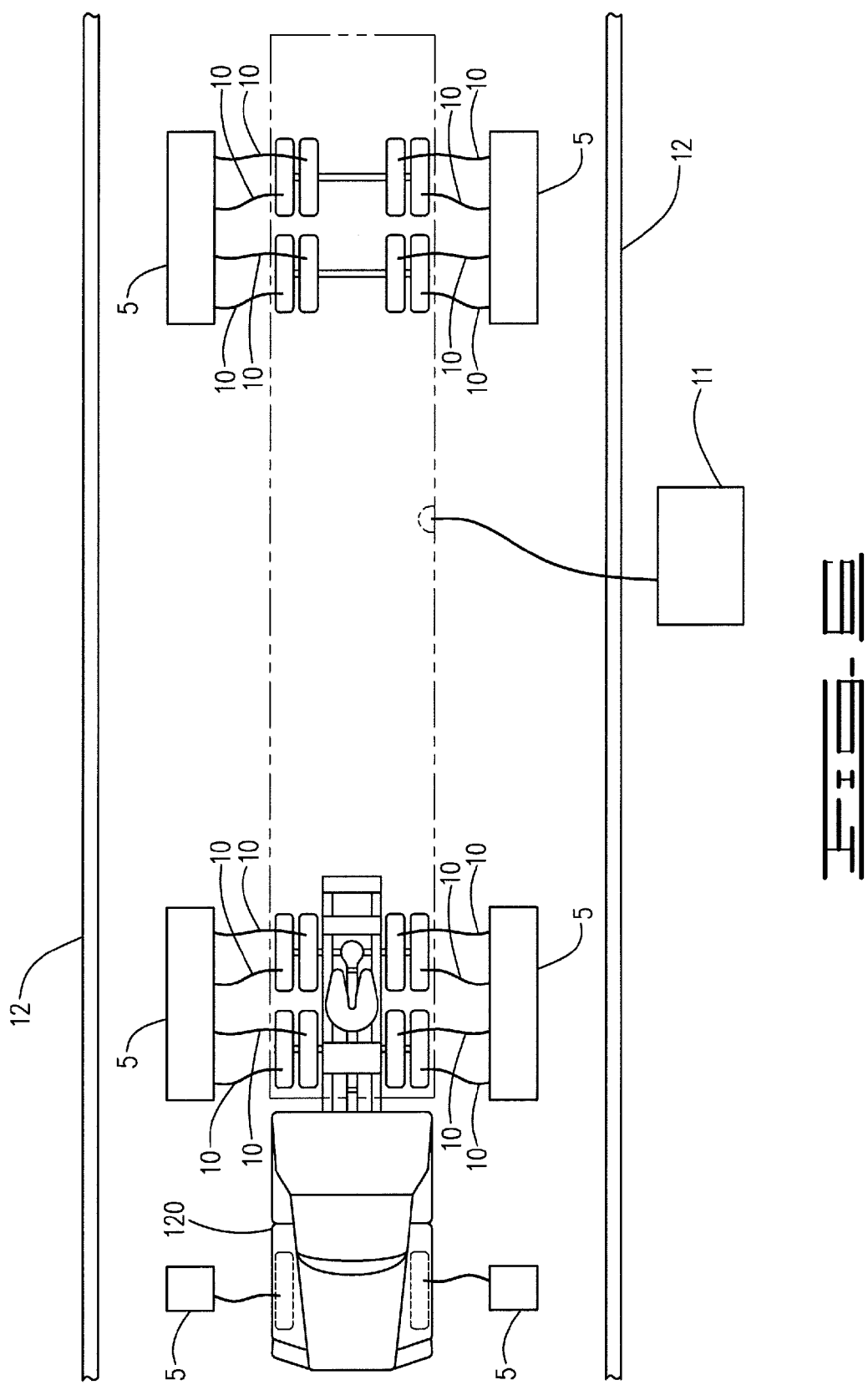

VEHICLE SERVICING AND MONITORING METHOD AND SYSTEM

This application is a Division of application Ser. No. 14/616,469, filed Feb. 6, 2015

FIELD OF THE INVENTION

The present disclosure relates to a method and system for providing maintenance to a vehicle using vehicle pre-determined maintenance settings, vehicle identifying information, a communication device and a vehicle maintenance tool.

BACKGROUND OF THE INVENTION

Vehicles, including but not limited to semi-trailers, eighteen wheelers, big rigs, tractor-trailers and the like, require periodic maintenance to remain in operation. For example, such vehicles require periodic inflation or replacement of their tires and periodic replacement of other parts including headlights, wiper blades and the like. Keeping track of the maintenance required by vehicles and performing such maintenance requires time and expense.

SUMMARY OF THE INVENTION

The present disclosure provides a system that allows for the capture of data related to the current air pressure of a tire and the correction of the air pressure of the tire using automatic tire measuring and tire inflation equipment for use at a tire inspection lane at an on-highway retail facility.

In one embodiment, the present disclosure provides a system comprising a database containing vehicle pre-determined maintenance settings, vehicle identifying information and a communication device. The communication device can be configured to receive the vehicle identifying information and obtain the vehicle pre-determined maintenance settings through an electronic network. The system can further comprise a tire inflation unit, wherein said tire inflation unit is configured to communicate with said communication device and interact with said vehicle in accordance with said vehicle pre-determined maintenance settings.

In another embodiment, the present disclosure provides placing a fuel pump close enough to a tire inflation unit, as part of a fueling lane, so as to allow the fuel pump to provide fuel to a vehicle while the tire inflation unit is interacting with the tires. Additionally, the fuel pump can provide diesel fuel.

The present vehicle pre-determined maintenance settings can comprise tire pressure preferences. In a further embodiment, the tire inflation unit is configured to measure the pressure of a tire. In an additional embodiment, the tire inflation unit interacts with a vehicle by inflating a tire to a pressure indicated by the pressure preferences. In an added embodiment, the tire inflation unit is configured to measure the pressure of a tire and inflate the tire simultaneously. In an additional embodiment, the tire inflation unit is configured to communicate the pressure of the tire to the communication device.

In another provided embodiment, the vehicle pre-determined maintenance settings comprise tread depth preferences. In an even further embodiment, the vehicle maintenance tool is a tread depth gauge. In another embodiment, the tread depth tool interacts with a vehicle by indicating whether a tire has a minimum tread depth as indicated by the tread depth preferences. In another embodiment, the tread depth tool is configured to communicate a tread depth of the tire to the communication device.

The present disclosure also provides a method that allows for the capture of data related to the current air pressure of a tire and correction of the air pressure of the tire using automatic tire measuring and tire inflation equipment for use at a tire inspection lane at an on-highway retail facility.

In one embodiment, the method includes identifying a vehicle, associating vehicle pre-determined maintenance settings with the vehicle and servicing a tire in accordance with said vehicle pre-determined maintenance settings. In another embodiment, the vehicle pre-determined maintenance settings include tire pressure preferences. In a further embodiment, the method includes inflating a tire in accordance with the tire pressure preferences. In an even further embodiment, the method comprises measuring the tire pressure as the tire is being inflated. In an additional embodiment, the vehicle pre-determined maintenance settings include tread depth preferences. In an added embodiment, the method includes recording a tread depth of a tire. In an added embodiment, the maintenance performed on the vehicle includes replacing the tire in accordance with the tread depth preferences.

BRIEF DESCRIPTION OF THE DRAWINGS

FIG. 4 is diagram illustrating an example of a tread depth tool that can be used in connection with the present disclosure.

FIG. 5 is a diagram illustrating an example of a wireless pressure stick that can be used in connection with the present disclosure.

FIG. 6 is a diagram illustrating an example of several tire inflation units interacting with a vehicle.

DETAILED DESCRIPTION

The present disclosure provides a system and method that allows for the capture of data related to the current air pressure and the correction of air pressure of a tire using automatic tire measuring and tire inflation equipment for use at a tire inspection lane at an on-highway retail facility.

Figure 1:
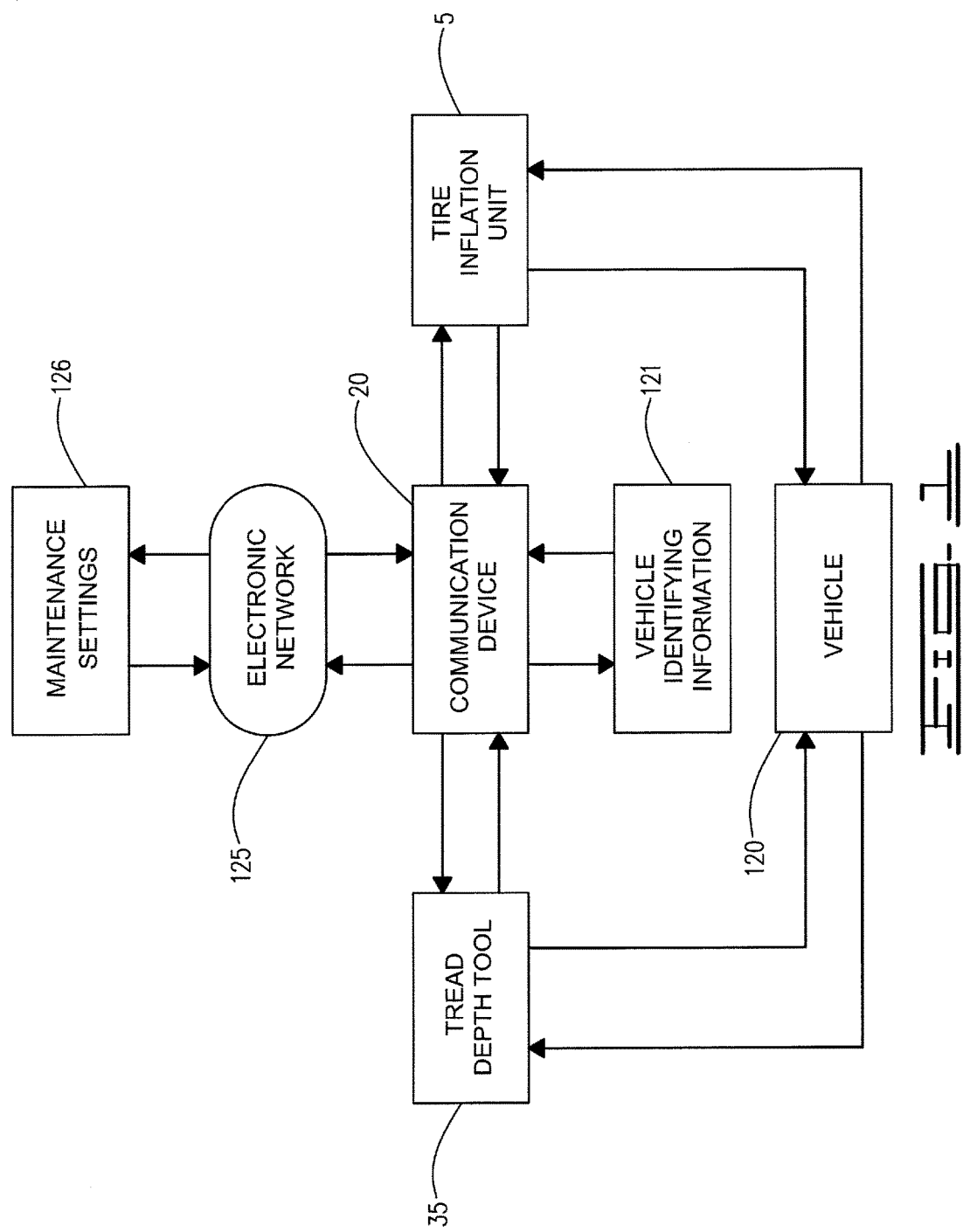
FIG. 1 is a diagram illustrating an example of possible interactions between various components of one embodiment of the present disclosure.

Turning to FIG. 1, an example of how components comprising the present disclosure can interact is provided. Vehicle pre-determined maintenance settings 126 can comprise digital information and can be stored in any suitable location. For example, vehicle pre-determined maintenance settings 126 can exist as digital information stored in a database. As used herein, a database is organized information stored in or on a medium. Such mediums can include a document, a computer, a server, an electronic network such as a cloud network, compact disc, magnetic tape or the like.

Additionally, the vehicle pre-determined maintenance settings 126 can be capable of interacting with an electronic network 125. For example, if the vehicle pre-determined maintenance settings 126 exist as digital information on a computer, then the computer can be capable of interacting with the internet or cellular networks.

As used herein, an electronic network 125 can be a system capable of transmitting information including vehicle pre-determined maintenance settings 126. For example, an electronic network 125 can include a local area network, a cellular network, the internet or a combination thereof. By interacting with one or more electronic networks with which the vehicle pre-determined maintenance settings 126 can also interact, the communication device 20 can obtain the vehicle pre-determined maintenance settings 126. For example, the communication device 20 can retrieve the vehicle pre-determined maintenance settings 126 over the internet or a cellular network. In this way, the communication device 20 can obtain the vehicle pre-determined maintenance settings 126 at a variety of locations and associate the vehicle pre-determined maintenance settings 126 with a particular vehicle 120.

Vehicle pre-determined maintenance settings 126 store information about how the owners, operators or drivers of a vehicle 120 would like their vehicle 120 to be maintained. Vehicle pre-determined maintenance settings 126 can relate to any maintenance that can be required by a vehicle 120. For example, vehicle pre-determined maintenance settings 126 can specify the frequency with which oil changes should be performed, the frequency with which wiper blades are to be replaced, the frequency with which tires are to be replaced and the like. Additionally, vehicle pre-determined maintenance settings 126 can specify whether reusable components like headlights, wiper blades and the like are to be replaced when a visual or other inspection indicates that the component is worn out. The vehicle 120 can be a tractor or a trailer. A system capable of servicing tractors or trailers will allow owners or drivers of such vehicles to obtain information about their vehicles in situations where one party owns the tractor of the vehicle 120 and another party owns the trailer of the vehicle 120.

For further example, the vehicle pre-determined maintenance settings 126 can include tire pressure preferences. Tire pressure preferences include information about the desired pressure of tires used in connection with the vehicle 120. For example, tire pressure preferences can include the minimum pressure of the tire, the maximum pressure of the tire and the optimal pressure of the tire. For additional example, the maintenance settings can include tread depth preferences. Tread depth preferences can include information about the desired tread depth of tires. For example, tread depth preferences can specify the minimum amount of tread on a tire indicating that a tire should be replaced.

The vehicle pre-determined maintenance settings 126 can be associated with a particular vehicle 120 or a group of vehicles. Stated another way, any given vehicle 120 can have one or more associated vehicle pre-determined maintenance settings 126. For example, a particular entity can have a plurality of vehicles, each having individual vehicle pre-determined maintenance settings 126 or the entity could specify uniform vehicle pre-determined maintenance settings 126 for all or some of the vehicles. For example, the vehicle pre-determined maintenance settings 126 could specify that each vehicle 120 in a group of vehicles should have their tires inflated to 100 psi or the vehicle pre-determined maintenance settings 126 could specify that some vehicles should have their tires inflated to 105 psi and others 95 psi. The vehicle pre-determined maintenance settings 126 of a particular vehicle 120 are associated with the particular vehicle 120 using vehicle identifying information 121. For example, if the vehicle pre-determined maintenance settings 126 are stored as digital data, then vehicle identifying information 121 can be associated with the appropriate vehicle pre-determined maintenance settings 126. In this way, vehicle identification information 121 can identify specific vehicle pre-determined maintenance settings 126.

Vehicle identifying information 121 can include a variety of mechanisms for identifying a particular vehicle 120. For example, vehicle identifying information 121 can include the VIN of a vehicle 120, the license plate of the vehicle 120 or can be provided to a customer or vehicle 120 specifically for use with the present disclosure. For example, the provider of services under the present disclosure can provide a scannable bar code or radio frequency identifier to a vehicle 120. Regardless of the type of vehicle identification information 121 used, the purpose of such vehicle identification information 121 is to associate a specific vehicle 120 with its associated vehicle pre-determined maintenance settings 126.

The vehicle identifying information 121 is associated with the maintenance settings for a given vehicle 120 using a communication device 20. A communication device 20 can be an electronic device capable of sending and receiving electronic information. For example, the communication device can take the form of a personal digital assistant, a tablet, a cellular phone, a laptop or the like. The communication device 20 can be configured to receive the vehicle identifying information 121. The proper configuration for the communication device 20 can depend on the form of the vehicle identifying information 121. For example, if the vehicle identifying information 121 comprises a scannable bar code, then the communication device 20 can include a component or attachment capable of scanning barcodes. Similarly, if the vehicle identifying information 121 is a VIN, the communication device 20 could include a data input similar to a keyboard. The communication device 20 can also interact with an electronic network 125. For example, the communication device 20 can interact with an electronic network 125 to access the vehicle pre-determined maintenance settings 126.

Once the vehicle pre-determined maintenance settings 126 have been associated with a particular vehicle 120 using the vehicle identification settings 121, the communication device 20 can communicate either the vehicle pre-determined maintenance settings 126 or commands related to the vehicle pre-determined maintenance settings 126 to one or more vehicle maintenance tools. Optionally, the vehicle identification settings 121 can be associated with the vehicle pre-determined maintenance settings 126 on the customer's first visit. In the embodiment shown in FIG. 1, the vehicle maintenance tools comprise a tread depth tool 35 and the tire inflation unit 5. However, any tool capable of use in maintaining a vehicle 120 can act as a vehicle maintenance tool.

The vehicle maintenance tools can communicate, electronically or otherwise, with the communication device 20 to receive the vehicle pre-determined maintenance settings 126 or commands related to such vehicle pre-determined maintenance settings 126. The various vehicle maintenance tools are also configured to interact with the vehicle 120 in accordance with the vehicle pre-determined maintenance settings 126. Examples are provided in FIGS. 3, 4 and 5. Because each of the vehicle maintenance tools obtains vehicle pre-determined maintenance settings 126 through communication device 20, an embodiment of the communication device 20 is provided first.

In some embodiments, the present disclosure is also adapted to store information related to the pressure and tread depth of a tire. For example, the tread depth of a tire, the air pressure of the tire, and information obtained from visual inspection of a tire can be input into communication device 20. Communication device 20 can then communicate such information to any suitable location, including a database. In some embodiments, such information can be accessed by the provider of the system and method provided in the present disclosure. Additionally, in some embodiments such information can be accessed by the owner or driver of a vehicle 120 that is serviced in connection with the present disclosure. For example, the provider of services described in the present disclosure can allow the owner or driver of the vehicle 120 to access information about one or more vehicles by logging into a website or through a mobile application.

Figure 2:
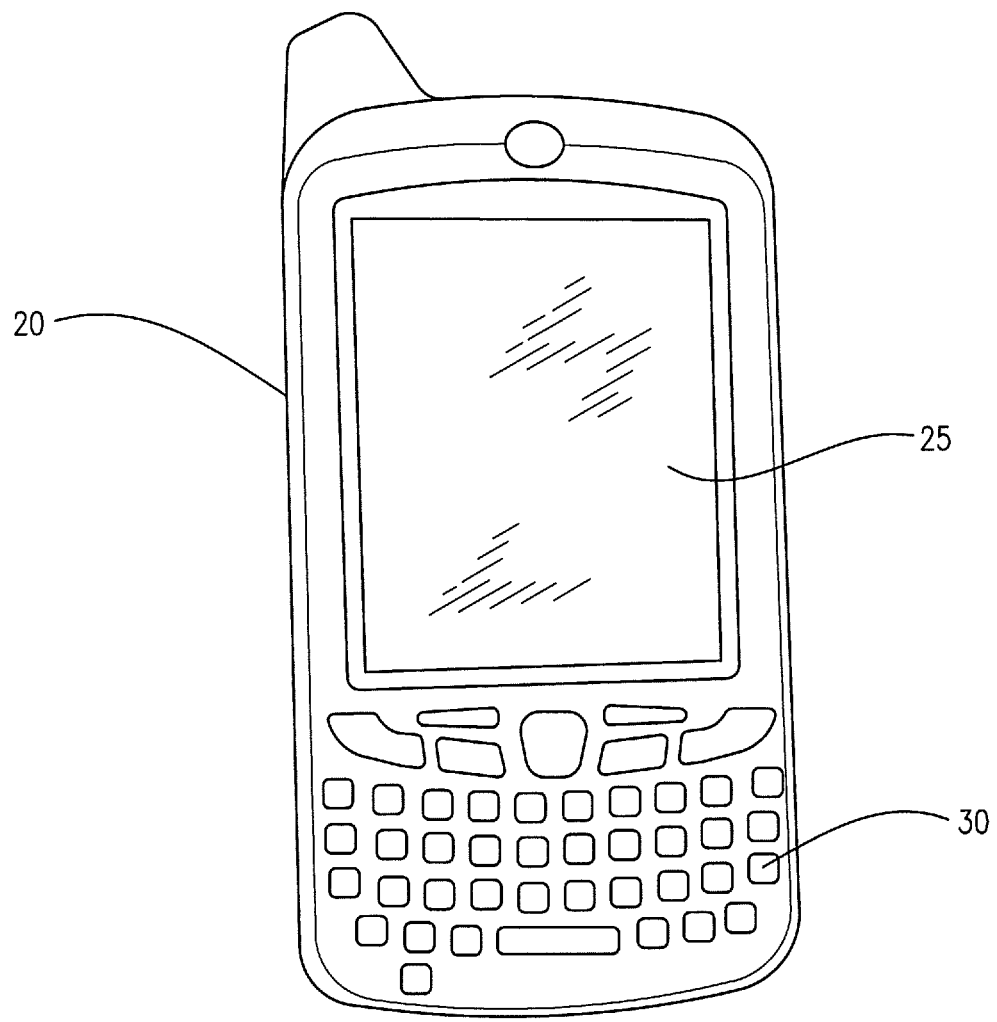
FIG. 2 is a diagram illustrating an example of a communication device that can be used in connection with the present disclosure.

Turning to FIG. 2, one embodiment of a communication device 20 is provided. As discussed, the communication device 20 is capable of a variety of embodiments. However, in the embodiment shown in FIG. 2, the communication device 20 comprises at least a display 25 and a data input 30. The display 25 is adapted to display any information capable of use in connection with the present disclosure. For example, the display 25 can display all or certain aspects of the vehicle pre-determined maintenance settings 126 or all or part of the information being sent from the vehicle maintenance tools to the communication device 20. The data input 30 can also have a variety of forms. In one embodiment, the data input 30 is similar to a keyboard. However, the data input 30 can have any suitable form including a touchpad or a scanning device that can depend in part on the type of vehicle identifying information 121 used with the present disclosure. As discussed, the communication device 20 can be adapted to interact with and communicate through an electronic network 125.

Having received the vehicle pre-determined maintenance settings 126, the communication device 20 communicates such vehicle pre-determined maintenance settings 126 to one or more vehicle maintenance tools. For example, the communication device 20 can communicate the vehicle pre-determined maintenance settings 126 to a vehicle maintenance tool using Bluetooth® technology, wireless networks, the Internet, cellular networks or the like.

As discussed, in one embodiment of the present disclosure vehicle maintenance tools include a tire inflation unit 5, a tread depth tool 35 or both. Once one or more vehicle maintenance tools receives vehicle pre-determined maintenance settings 126 or commands related to such settings, the vehicle maintenance tool can interact with a vehicle 120 in accordance with the vehicle pre-determined maintenance settings 126. Examples of specific vehicle maintenance tools interacting with a vehicle 120 are provided below.

Figure 3:
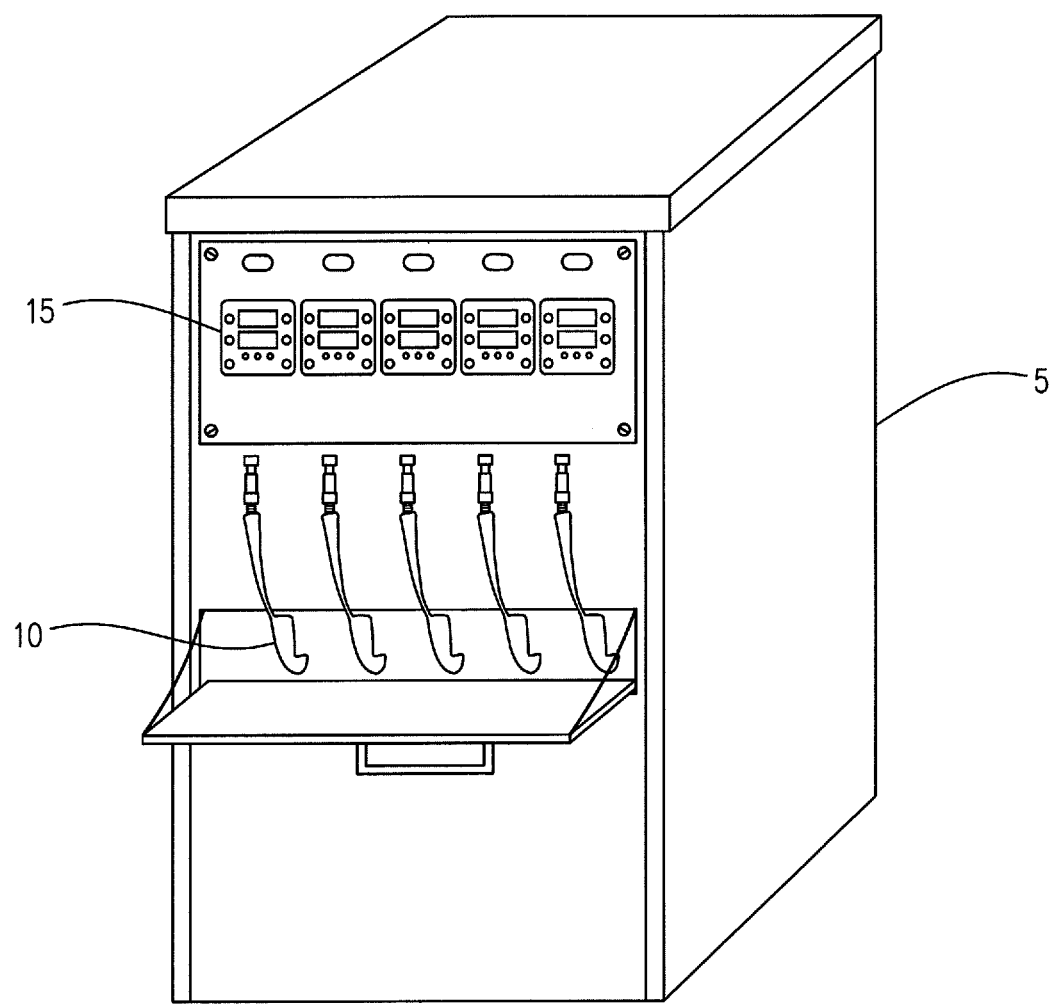
FIG. 3 is a diagram illustrating an example of a tire inflation unit that can be used in connection with the present disclosure.

Turning to FIG. 3, the vehicle maintenance tool 35 can be a tire inflation unit 5. As discussed, the tire inflation unit can be configured to communicate electronically with the communication device 20 and receive relevant vehicle pre-determined maintenance settings 126. For example, a tire inflation unit 5 can receive vehicle pre-determined maintenance settings 126 that relate to minimum, maximum and preferred tire pressures for an individual vehicle 120 or for a vehicle as part of a fleet of vehicles.

The tire inflation unit 5 can comprise one or more tire inflation hoses 10 and a pressure display 15. The tire inflation hoses 10 along with the tire inflation unit 5 can be configured to inflate one or more tires on a vehicle. For example, a tire inflation hose 10 can be adapted to attach to a tire stem and convey pressurized gas from the tire inflation unit 5 to the tire. The tire inflation unit 5 can be attached to a source of pressurized gas which can be conveyed from the source to the tires. Thus, the tire inflation unit 5 can adjust the pressure of a tire to match the desired pressure indicated by the vehicle pre-determined maintenance settings 126.

Additionally, the tire inflation unit 5 can measure the pressure of a tire. The tire inflation unit 5 can measure the pressure of a tire before pressurizing the tire, as the tire is being pressurized and after the tire has been pressurized. Additionally, the tire inflation unit 5 can measure the pressure of one or more tires simultaneously and pressurize one or more tires simultaneously. By choosing the appropriate number of tire inflation units present at a given location, the operator of the system described in the present description can measure and inflate any number of tires simultaneously as desired.

In this way, the tire inflation unit 5 can automatically pressurize a tire to the pressure indicated by the vehicle pre-determined maintenance settings 126 without the need to iteratively adjust the tire pressure and measure the tire pressure. For example, if the vehicle pre-determined maintenance settings 126 indicate that the desired pressure of the tire is 100 psi but the tire is currently at 80 psi, the tire inflation unit 5 can pressurize the tire while measuring the pressure of the tire. The tire inflation unit 5 can then either stop pressurizing the tire when the tire reaches 100 psi or can stop the flow of gas to the tire as the tire approaches 100 psi. In some embodiments, the tire inflation unit 20 can send the measured pressure information of the tires to the communication device 20 or through an electronic network to any desired location. The tire inflation unit 5 can also send the measured pressure information of the tires to the communication device 20 as the tire inflates at periodic intervals.

In some embodiments, the system can include advising the driver of the vehicle, the owner of the vehicle or an operator using the presently described system that tire pressure in a tire is too low, or below a threshold indicated in the vehicle pre-determined maintenance settings 126. Upon determining that the pressure in a tire is below some threshold indicated in the vehicle pre-determined maintenance settings 126, the system can advise that the tire be replaced or inspected.

Additionally, an operator using the presently described system can conduct visual inspections of the tires and replace the tires as needed or in accordance with preferences indicated in the vehicle pre-determined maintenance settings 126. In some embodiments, the visual inspection of the tires can be input into the communication device 20. The communication device 20 can then communicate the visual inspection to a database. For example, the database can be the same database that stores the vehicle pre-determined maintenance settings 126 or can be another database altogether.

Turning to FIG. 4, another example of a vehicle maintenance tool is provided. For example, a tread depth tool 35 can be used in connection with the present system and method. Similar to the tire inflation unit 5, the tread depth tool can be configured to communicate electronically with the communication device 20. As such, the tread depth tool 35 can receive vehicle pre-determined maintenance settings 126 related to tread depth. For example, the vehicle pre-determined maintenance settings 126 can provide a minimum tread depth for a tire wherein if the tread depth is below the minimum tread depth the tire should be replaced.

The tread depth tool 35 can comprise an elongated member 40 and a display 45. The elongated member 40 can be inserted into a tread groove. The tread depth tool 35 can then be pressed against the tire and the elongated member 40 can retract into the body of the tread depth tool 35. By measuring the extent to which the elongated member 40 is pressed into the body of the tread depth tool 35, the tread depth tool 35 can calculate the tread depth of the tire. For example, the more worn out the tread, the greater the extent to which the elongated member 40 retracts into the body of the tread depth tool 35. For example, if the tread depth tool 35 indicates that the tread depth of a tire is below the minimum tread indicated in the tread depth preferences, then the tire can be replaced.

The display 45 can either display an aspect of the vehicle pre-determined maintenance settings 126, the measured tread depth or any other information. In some embodiments, the tread depth tool 35 can transmit information to and receive information from a communication device 20. For example, not only can the tread depth tool 35 receive vehicle pre-determined maintenance settings 126 related to tread depth but it can also send the measured tread depth to the communication device 20 or to an electronic network 125. In some embodiments, the tread depth tool 35 does not need to receive vehicle pre-determined maintenance settings 126. For example, if the tread depth tool 35 measures the tread of a tire and sends the tread depth information to the communication device 20, the communication device 20 can determine whether the tire was in conformity with the vehicle pre-determined maintenance settings 126 without the need for the tread depth tool 35 to receive the maintenance settings.

Turning to FIG. 5, another example of a vehicle maintenance tool is provided. For example a wireless pressure stick 50 can be used in connection with the present method and system. The wireless pressure stick 50 can send or receive information from the communication device 20. For example, the wireless pressure stick can be adapted to receive vehicle pre-determined maintenance settings 126 from the communication device 20, send pressure information from a tire to the communication device 20, or both. For example, the wireless pressure stick 50 is adapted to interact with a tire and measure its pressure. For example, the wireless pressure stick 50 can interact with a tire stem and electronically send the measured pressure of the tire to the communication device 20.

Although specific examples of vehicles' maintenance tools have been provided, any suitable tool can be used in connection with the present method and system. Such vehicle maintenance tools can be either adapted to receive maintenance settings, electronically communicate some information to the communication device 20 or both. The vehicle maintenance tools can be adapted to send and receive information either wired or wirelessly.

Turning to FIG. 6, an example of tire inflation units 5 interacting with a vehicle 120 in accordance with the present disclosure is provided. In the embodiment shown, several tire inflation units 5 comprise four tire inflation hoses 10 and several include a single tire inflation hose 10. The tire inflation unit 5 can comprise any number of tire inflation hoses 10. In the embodiment shown, enough tire inflation units 5 having tire inflation hoses 10 are provided to simultaneously inflate all the tires of a vehicle 120 having eighteen wheels. For example, in the embodiment shown in FIG. 6, the tire inflation hoses can simultaneously inflate and measure the pressure of each of the eighteen wheels.

The present disclosure also provides a fuel pump 11. The fuel pump 11 can be any suitable pump used for fueling vehicles, especially eighteen wheelers, big rigs and the like. The fuel pump 11 can be positioned close enough to a tire inflation unit 5 so as to allow both the tire inflation unit 5 to inflate the tires of said vehicle 120 and the fuel pump 11 to provide fuel to the vehicle 120 at the same time. Both the fuel pump 11 and the tire inflation unit 5 can be positioned as part of or adjacent to a fueling lane 12. As such, drivers of vehicles can have their tires inflated and their vehicles fueled simultaneously.

The present disclosure also provides a method for servicing vehicles. For example, the method can include identifying a vehicle. In one embodiment of the present disclosure, identifying a vehicle can be performed using a communication device. For example, a communication device 20 can identify a vehicle by using vehicle identifying information. For example, such vehicle identifying information can be the VIN of the vehicle, a provided barcode or a radio frequency identifier.

Additionally, the method includes associating with the vehicle the vehicle pre-determined maintenance settings of the vehicle. For example, the method can associate the vehicle pre-determined maintenance settings of the vehicle with the particular vehicle in question by using the vehicle identification information. The vehicle pre-determined maintenance settings can include any information related to performing maintenance on a vehicle. For example, the vehicle pre-determined maintenance settings can include optimal tire pressure and the minimum tread depth of tires on the vehicle.

Finally, the disclosed method can include providing maintenance to the vehicle in accordance with the vehicle pre-determined maintenance settings associated with the vehicle. For example, if the disclosed method includes an optimal tire pressure for the tires of a particular vehicle, a tire inflation unit can automatically inflate the tires of the vehicle to the optimal pressure indicated by the vehicle pre-determined maintenance settings.

What is claimed is:

1. A method that allows for the capture of data related to the current air pressure of a tire and the correction of said air pressure using automatic tire measuring and tire inflation equipment for use at a tire inspection lane at an on-highway retail facility, comprising:
   a. identifying a vehicle by receiving vehicle identifying information from a vehicle, wherein said vehicle identifying information is received in a communication device;
   b. associating vehicle pre-determined maintenance settings with said vehicle;
   c. receiving said vehicle pre-determined maintenance settings through an electronic network, wherein said vehicle pre-determined maintenance settings are received based on said vehicle identifying information received;
   d. performing maintenance on said vehicle based on said vehicle pre-determined maintenance settings, wherein said maintenance is performed by a maintenance tool;
   e. interacting said maintenance tool with said vehicle and said communication device during the performance of maintenance so that the maintenance tool receives said pre-determined maintenance setting, interacts with the vehicle in accordance with the pre-determined maintenance settings and sends information on the maintenance to the communication device, and wherein maintenance includes correction of said air pressure of said tire, and said interaction includes measurement of the air pressure during said correction of said air pressure and transmittal of said measurement to said communication device; and
   (f) updating a database with said information on the maintenance sent to the communications device.

2. The method of claim 1, wherein said step of performing maintenance includes correction of said air pressure of said tire in accordance with said vehicle pre-determined maintenance settings and said method further comprises positioning a fuel pump so as to allow said fuel pump to pump fuel into said vehicle at the same time said tire of said vehicle is being inflated.

3. The method of claim 2, wherein said fuel is diesel fuel.

4. The method of claim 1, wherein said vehicle pre-determined maintenance settings include tire pressure preferences.

5. The method of claim 4, wherein said step of performing maintenance includes inflating a tire in accordance with said vehicle pre-determined maintenance settings.

6. The method of claim 5, further comprising recording said tire pressure of said tire either before or while said tire is being inflated.

7. The method of claim 1, wherein said vehicle pre-determined maintenance settings include tread depth preferences.

8. The method of claim 7, further comprising recording a tread depth of a tire.

9. The method of claim 8, wherein said maintenance includes replacing said tire in accordance with said tread depth preferences.

10. The method of claim 1, wherein said vehicle pre-determined maintenance settings include data on tire pressure and include data on one or more of maintenance, condition or replacement of vehicle equipment.

11. The method of claim 10, further comprising inflating a plurality of tires simultaneously.

12. The method of claim 11, wherein the step of inflating a plurality of tires simultaneously comprises engaging a first tire inflation unit with at least one tire on a first side of said vehicle and engaging a second tire inflation unit with at least one tire on a second side of said vehicle such that said first tire inflation unit and said second tire inflation unit measure pressure and pressurize said at least one tire on said first side and said at least one tire on said second side simultaneously.

13. The method of claim 12, wherein said first tire inflation unit is configured to interact with a first plurality of tires on said first side and said second tire inflation unit is configured to interact with a second plurality of tires on said second side such that the plurality of tire inflation units measure pressure and pressurize simultaneously all of said tires in said first plurality of tires and said second plurality of tires.

14. The method of claim 11, wherein the step of inflating a plurality of tires simultaneously comprises engaging a plurality of tire inflation units with multiple sets of tires so as to measure pressure and pressurize said multiple sets of tires simultaneously.

15. The method of claim 14, wherein each set of said multiple sets of tires comprises multiple tires, and wherein said plurality of tire inflation units engage with each of said multiple sets of tires to measure the pressure and pressurize each tire of said multiple tires simultaneously.

16. The method of claim 1, wherein said vehicle has a radio frequency identifier and the step of identifying said vehicle comprises receiving said vehicle identifying information from said vehicle by said radio frequency identifier.

17. The method of claim 1, wherein said vehicle is labeled with a scannable bar code and the step of identifying said vehicle comprises receiving said vehicle identifying information from said vehicle by scanning said scannable bar code.

18. The method of claim 17, further comprising inflating a plurality of tires simultaneously.

19. The method of claim 18, wherein said vehicle pre-determined maintenance settings include data on tire pressure and include one or more of data on maintenance, condition or replacement of vehicle equipment.

* * * * *